United States Patent
Huang et al.

(10) Patent No.: US 11,086,451 B2
(45) Date of Patent: Aug. 10, 2021

(54) ELECTRONIC APPARATUS AND OBJECT INFORMATION RECOGNITION METHOD BY USING TOUCH DATA THEREOF

(71) Applicant: Acer Incorporated, New Taipei (TW)

(72) Inventors: Chih-Wen Huang, New Taipei (TW); Eric Choi, New Taipei (TW); Wen-Cheng Hsu, New Taipei (TW); Chao-Kuang Yang, New Taipei (TW); Yen-Shuo Huang, New Taipei (TW); Ling-Fan Tsao, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 16/824,704

(22) Filed: Mar. 20, 2020

(65) Prior Publication Data

US 2021/0117041 A1   Apr. 22, 2021

(30) Foreign Application Priority Data

Oct. 18, 2019   (TW) .................................. 108137615

(51) Int. Cl.
   *G06F 3/042*   (2006.01)
(52) U.S. Cl.
   CPC .................................. *G06F 3/0421* (2013.01)
(58) Field of Classification Search
   None
   See application file for complete search history.

(56) References Cited

U.S. PATENT DOCUMENTS

| | | | |
|---|---|---|---|
| 9,269,022 B2 | 2/2016 | Rhoads et al. | |
| 2010/0046850 A1* | 2/2010 | Ho | G06F 3/04883 382/257 |
| 2012/0182225 A1* | 7/2012 | Brosnan | G06F 21/34 345/173 |
| 2016/0299615 A1* | 10/2016 | Schwarz | G06K 9/6201 |
| 2017/0228096 A1* | 8/2017 | Nathan | G06F 3/041661 |
| 2018/0121762 A1* | 5/2018 | Han | G06K 9/4671 |

FOREIGN PATENT DOCUMENTS

| | | |
|---|---|---|
| CN | 106662946 | 5/2017 |
| CN | 106687967 | 5/2017 |
| TW | 201915943 | 4/2019 |

\* cited by examiner

*Primary Examiner* — Amare Mengistu
*Assistant Examiner* — Sarvesh J Nadkarni
(74) *Attorney, Agent, or Firm* — JCIPRNET (57) ABSTRACT

An electronic apparatus and an object information recognition method by using touch data thereof are provided. A current touch sensing frame is obtained through a touch panel. The current touch sensing frame includes a plurality of frame cells respectively corresponding to a plurality of touch sensing units, and each of the frame cells has touch raw data. The frame cells include a target frame cell. A new cell value corresponding to the target frame cell is generated according to touch raw data of a plurality of adjacent frame cells adjacent to the target frame cell in the current touch sensing frame, so as to generate a transformation frame according to the new cell value. The transformation frame is transformed into a touch sensing image, and the touch sensing image is analyzed to recognize object information of a touch object.

14 Claims, 7 Drawing Sheets

| | | | | | | |
|---|---|---|---|---|---|---|
| | 3315 | 3249 | ..... | | 3003 | 2999 |
| | 3282 | 3220 | ..... | | 2984 | 2978 |
| F1 | ⋮ | ⋮ | ⋮ | | ⋮ | ⋮ |
| | 3285 | 3211 | ..... | | 3118 | 3116 |
| FC12 | 3323 | 3233 | ..... | | 3135 | 3127 |
| FC11 | 3379 | 3267 | ..... | | 3138 | 3126 |

ELECTRONIC APPARATUS AND OBJECT INFORMATION RECOGNITION METHOD BY USING TOUCH DATA THEREOF

CROSS-REFERENCE TO RELATED APPLICATION

This application claims the priority benefit of Taiwan application serial no. 108137615, filed on Oct. 18, 2019. The entirety of the above-mentioned patent application is hereby incorporated by reference herein and made a part of this specification.

BACKGROUND

Technical Field

The invention relates to an electronic apparatus, and particularly relates to an electronic apparatus and an object information recognition method by using touch data thereof.

Description of Related Art

In today's information society, people's dependence on consumable electronic apparatuses is increasing. In order to be convenient and user-friendly, many electronic apparatuses may adopt a touch panel as an input device. In recent years, touch electronic products have become popular in the market because they are easy to operate and highly intuitive. However, regarding the current electronic products in the market, a touch screen integrated with a display is generally used to receive a touch event issued by a user's hand or a stylus, so that the electronic product may perform a subsequent operation according to the touch event. In addition to detecting the touch event issued by the user's hand or stylus, how to extend the touch sensing of the touch screen to other applications is also a concern for those skilled in the art.

SUMMARY

The invention is directed to an electronic apparatus and an object information recognition method by using touch data thereof, which are adapted to accurately recognize object information of a touch object above a touch panel.

An embodiment of the invention provides an object information recognition method by using touch data. The method includes following steps. A current touch sensing frame is obtained through a touch panel. The current touch sensing frame includes a plurality of frame cells respectively corresponding to a plurality of touch sensing units, and each of the frame cells has touch raw data. The frame cells include a target frame cell. A new cell value corresponding to the target frame cell is generated according to touch raw data of a plurality of adjacent frame cells located adjacent to the target frame cell in the current touch sensing frame, so as to generate a transformation frame according to the new cell value. The transformation frame is transformed into a touch sensing image, and the touch sensing image is analyzed to recognize object information of a touch object.

An embodiment of the invention provides an electronic apparatus including a touch panel, a storage device storing a plurality of instructions and a processor. The processor is coupled to the touch panel and the storage device. The processor is configured to execute the instructions to execute following steps. A current touch sensing frame is obtained through the touch panel. The current touch sensing frame includes a plurality of frame cells respectively corresponding to a plurality of touch sensing units, and each of the frame cells has touch raw data. The frame cells include a target frame cell. A new cell value corresponding to the target frame cell is generated according to touch raw data of a plurality of adjacent frame cells located adjacent to the target frame cell in the current touch sensing frame, so as to generate a transformation frame according to the new cell value. The transformation frame is transformed into a touch sensing image, and the touch sensing image is analyzed to recognize object information of a touch object.

Based on the above description, in the embodiment of the invention, the current touch sensing frame sensed by the touch panel is transformed into a touch sensing image, and the object information of the touch object is recognized according to image characteristics of the touch sensing image. In this way, when the touch object contacts or is close to the touch panel, the electronic apparatus is capable of obtaining the object information of the touch object to execute other functions, so as to provide a new user operation experience and increase the functionality of the electronic apparatus. Moreover, in the embodiment of the invention, the current touch sensing frame is subjected to data normalization processing to eliminate an adverse effect of sensing noise of the touch panel on recognition accuracy.

To make the aforementioned more comprehensible, several embodiments accompanied with drawings are described in detail as follows.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts. Theses exemplary embodiments are only a part of the disclosure, and the disclosure does not disclose all of the implementations. More precisely, these exemplary embodiments are only examples of the apparatus and method in the claims of the disclosure.

In the following embodiments, when a device is referred to be "connected" or "coupled" to another device, it may be directly connected or coupled to said another device, or other devices probably exist there between. In other words, unless otherwise specified, the terms "connection" and "coupling" include direct and indirect connection and coupling of two devices.

Figure 1:
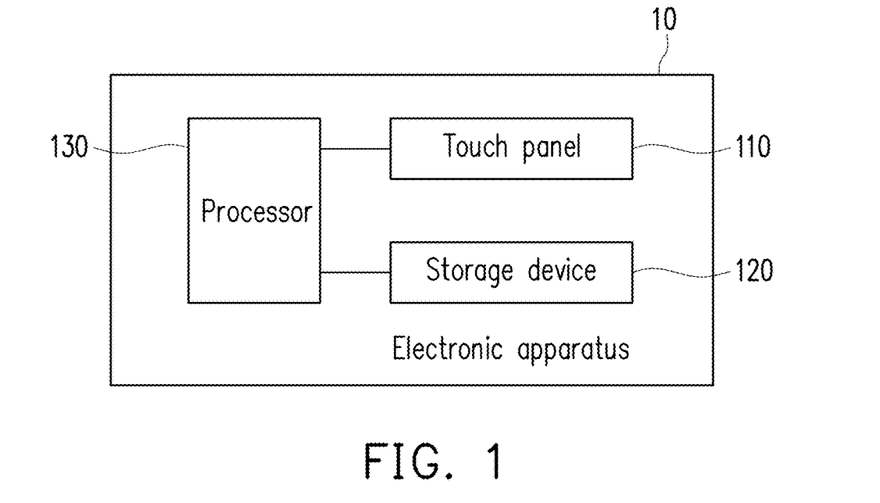
FIG. 1 is a schematic diagram of an electronic apparatus according to an embodiment of the invention.

FIG. 1 is a schematic diagram of an electronic apparatus according to an embodiment of the invention, but it is only for convenience of description and the invention is not limited thereto. First, FIG. 1 introduces all the components and configuration relationships in the electronic apparatus. Detailed functions and operations will be disclosed with reference of FIG. 2.

Referring to FIG. 1, the electronic apparatus 10 of the embodiment is, for example, an electronic apparatus having a touch function such as a notebook computer, a smart phone, a tablet computer, an e-book, a game machine, etc., but the invention is not limited thereto. The electronic apparatus 10 includes a touch panel 110, a storage device 120 and a processor 130, and functions thereof are described below.

The touch panel 110 is, for example, a capacitive touch panel, a resistive touch panel, an electromagnetic touch panel or an optical touch panel, etc. In an embodiment, the touch panel 110 may be integrated with a display device (not shown) to form a touch screen. The display device is, for example, a Liquid Crystal Display (LCD), a Light-Emitting Diode (LED) display, a Field Emission Display (FED) or other types of display. The touch panel 110 includes a plurality of touch sensing units arranged in an array to implement touch sensing, so as to obtain a touch sensing frame including touch raw data respectively corresponding to the touch sensing units.

The storage device 120 is configured to store touch data, instructions, program codes, software modules, etc., which may be any type of a fixed or movable Random Access Memory (RAM), a Read-Only Memory (ROM), a flash memory, a hard disk or other similar device, an integrated circuit and a combination thereof.

The processor 130 is coupled to the touch panel 110 and the storage device 120, and is configured to control operations between the components of the electronic apparatus 10, and is, for example, a Central Processing Unit (CPU), or other programmable general purpose or special purpose microprocessor, a Digital Signal Processor (DSP), programmable controller, an Application Specific Integrated Circuits (ASIC), a Programmable Logic Device (PLD), a Graphics Processing Unit (GPU) or other similar device or a combination of the above devices. The processor 130 may execute the program codes, software modules, instructions, etc., stored in the storage device 120 to implement an object information recognition method by using touch data of the embodiment of the invention.

However, in addition to the touch panel 110, the storage device 120 and the processor 130, the electronic apparatus 10 may further include other devices that are not illustrated in FIG. 1, such as a loudspeaker, a microphone, a display device, a camera, a communication module, a keyboard, etc., which is not limited by the invention.

Figure 2:
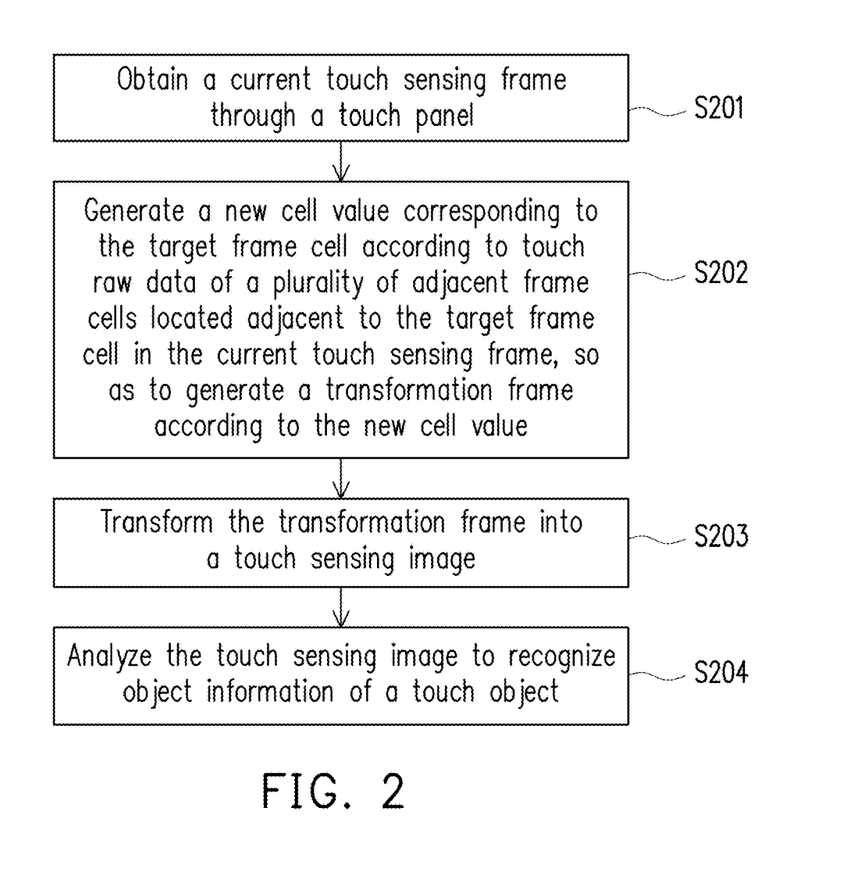
FIG. 2 is a flowchart illustrating an object information recognition method by using touch data according to an embodiment of the invention.

FIG. 2 is a flowchart illustrating an object information recognition method by using touch data according to an embodiment of the invention. Referring to FIG. 1 and FIG. 2, the method of the embodiment is adapted to the electronic apparatus 10 of FIG. 1, and a detailed flow of the method of the embodiment is introduced below with reference of various components of the electronic apparatus 10.

In a step S201, the processor 130 obtains a current touch sensing frame through the touch panel 110. The current touch sensing frame includes touch raw data respectively corresponding to the touch sensing units of the touch panel 110. The amount of the touch raw data is determined according to the number of the touch sensing units of the touch panel 110. For example, it is assumed that the touch panel 110 has m*n touch sensing units, the current touch sensing fame includes m*n frame cells respectively corresponding to m*n batches of touch raw data. It should be noted that a touch integrated circuit (IC) or other processing circuit in the electronic apparatus 10 may compare the touch raw data with a filter threshold value to filter the touch raw data smaller than the filter threshold value, so as to detect a touch event occurred on the touch panel 110. However, in an embodiment, the processor 130 obtains the touch raw data that is not subjected to the filtering processing. Namely, each of the frame cells in the current touch sensing frame obtained by the processor 130 has the touch raw data.

Figure 3A:
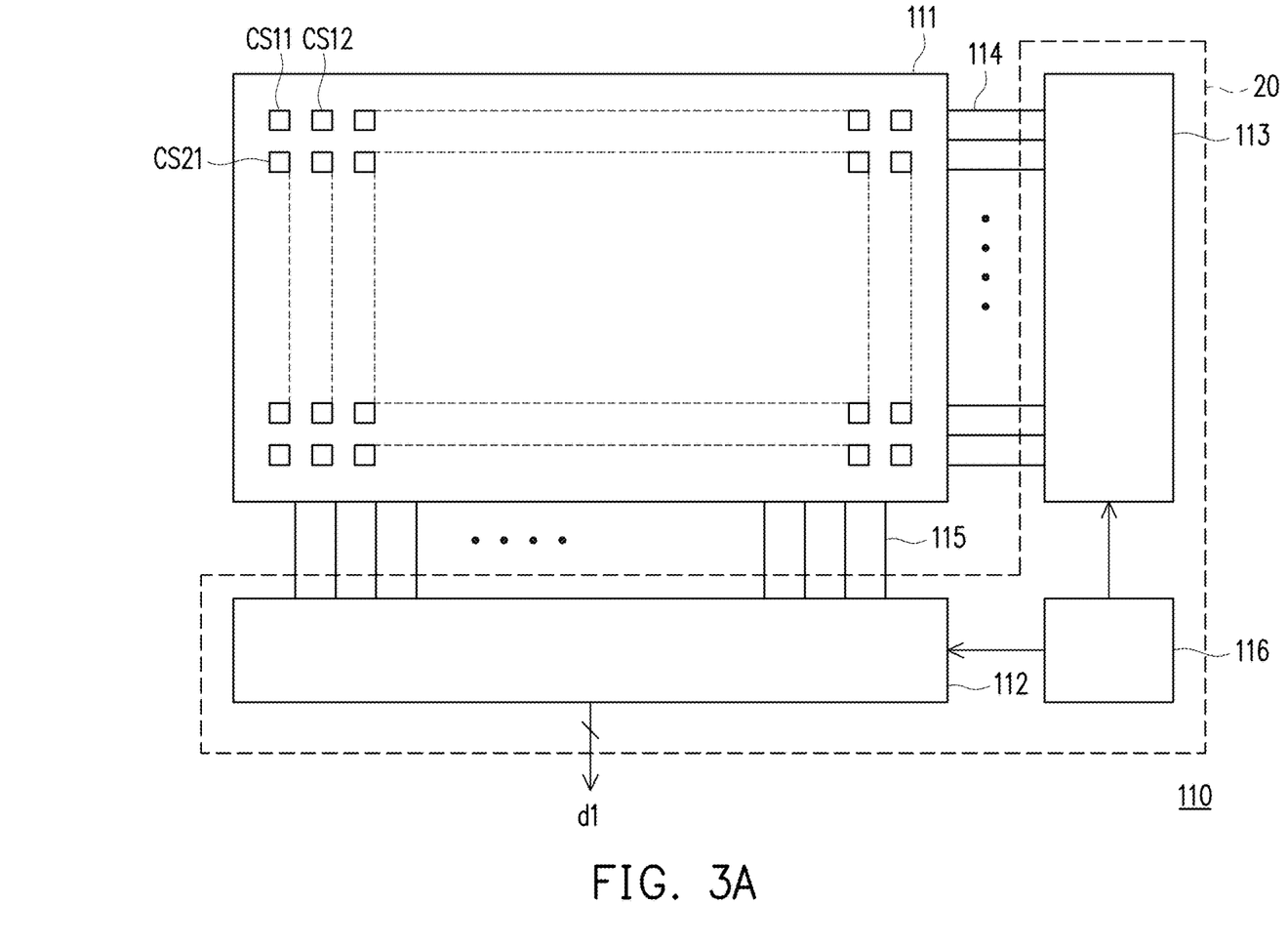
FIG. 3A is a schematic diagram of a touch panel according to an embodiment of the invention.
Figure 3B:
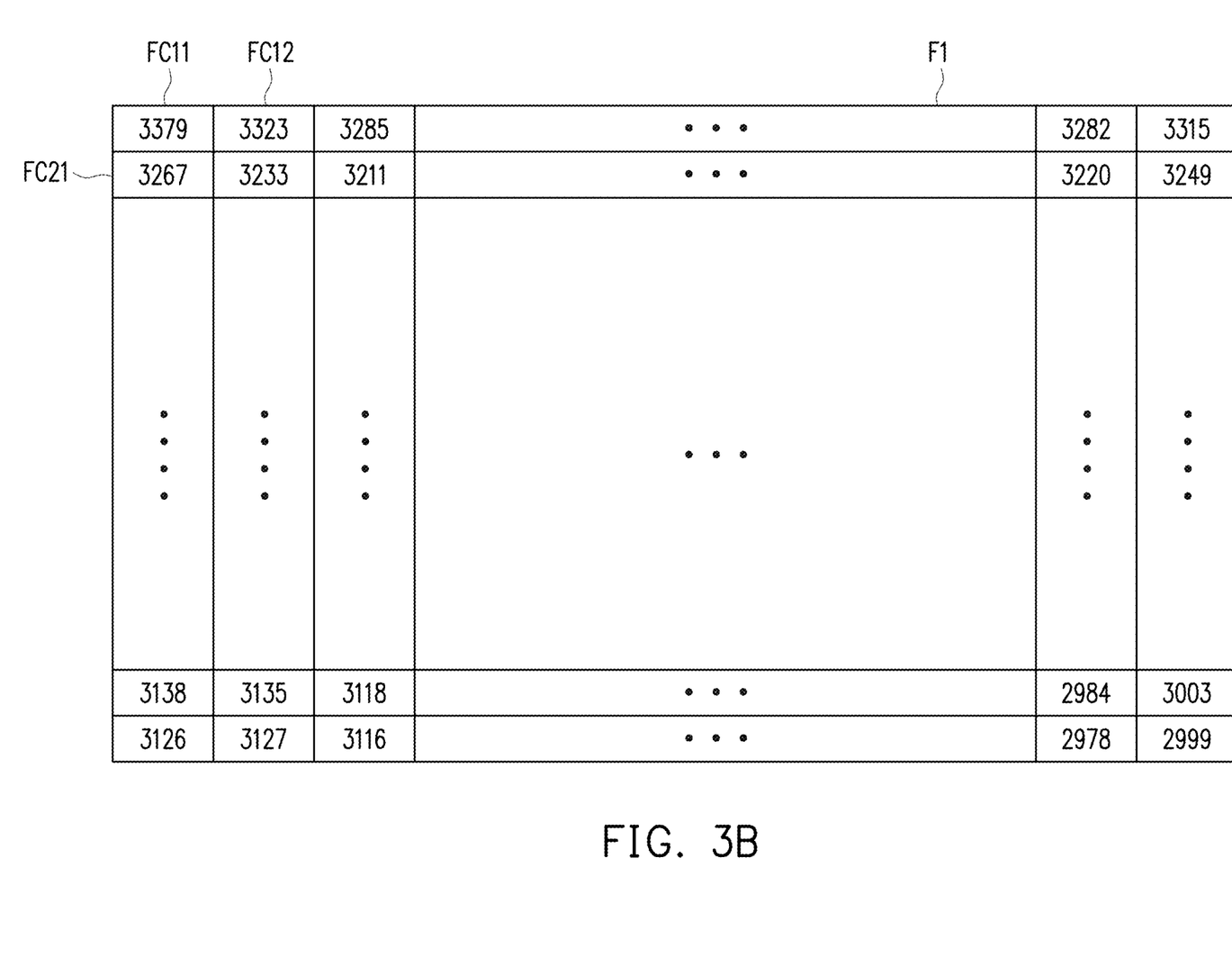
FIG. 3B is a schematic diagram of a touch sensing frame according to an embodiment of the invention.

Further, FIG. 3A is a schematic diagram of a touch panel according to an embodiment of the invention. FIG. 3B is a schematic diagram of a touch sensing frame according to an embodiment of the invention. Referring to FIG. 3A first, the touch panel 110 may include a sensing device array 111 and a touch sensing circuit 20, and the sensing device array 111 includes a plurality of touch sensing units (for example, touch sensing units CS11, CS12, CS21) arranged in an array. The touch sensing circuit 20 includes a scan driving circuit 113, a receiving sensing circuit 112, a timing generating circuit 116, etc. The scan driving circuit 113 applies a driving signal to the touch sensing units row by row through scan lines (for example, a scan line 114). The receiving sensing circuit 112 senses charge change amounts of the touch sensing units through sensing lines (for example, a sensing line 115), so as to receive touch sensing signals and output touch raw data dl. The receiving sensing circuit 112 may use Analog-to-Digital Converters (ADC) to convert the touch sensing signals generated by the touch sensing units into the digital touch raw data dl for outputting.

Referring to FIG. 3B, the current touch sensing frame F1 includes a plurality of frame cells (for example, frame cells FC11, FC12, FC21) respectively corresponding to the plurality of touch sensing units (for example, the touch sensing units CS11, CS12, CS21). For example, it is assumed that the touch panel 110 has 44*76 touch sensing units, and the current touch sensing frame F1 includes 44*76 frame cells. Moreover, each frame cell has the corresponding touch raw data. For example, the frame cell FC11 has touch raw data "3379"; the frame cell FC12 has touch raw data "3323"; and the frame cell FC21 has touch raw data "3267". In other words, the current touch sensing frame F1 may also be regarded as a 44*76 data array, and array elements in the data array are the touch raw data. However, FIG. 3B is for illustrative purposes only, and the numerical values shown therein are all examples and are not intended to limit the invention.

Then, in a step S202, the processor 130 generates a new cell value corresponding to a target frame cell according to the touch raw data of a plurality of adjacent frame cells located adjacent to the target frame cell in the current touch sensing frame, so as to generate a transformation frame according to the new cell value. To be specific, the frame cells include the target frame cell. In an embodiment, each of the frame cells in the current touch sensing frame may be the target frame cell. The processor 130 sequentially takes each of the frame cells in the current touch sensing frame as the target frame cell to generate the new cell value corresponding to each of the frame cells in the current touch sensing frame. In this way, a transformation frame is generated according to the new cell value of each of the frame cells in the current touch sensing frame. Alternatively, in an embodiment, the frame cell in a part of blocks of the current touch sensing frame may be the target frame cell.

Namely, by calculating the new cell value in the transformation frame according to the touch raw data of the plurality of adjacent frame cells located adjacent to the target frame cell, the processor 130 may perform smoothing processing to the touch raw data in the current touch sensing frame, so as to smooth a touch sensing noise component in the current touch sensing frame. In this way, the adverse effect of the touch sensing noise on the subsequent image recognition processing may be reduced. The touch sensing noise may be caused by a manufacturing process of the touch panel 110, a disposing manner of the touch panel 110 disposed on the electronic apparatus 10, environmental factors, or other factors. In other words, the transformation frame may also be regarded as a result of the processor 130 performing some denoising processing on the current touch sensing frame.

In a step S203, the processor 130 transforms the transformation frame into a touch sensing image. Based on a specific image format (for example, an image format required for a machine learning model) required for subsequent image processing, processor 130 may image the transformation frame into a grayscale image or a color image (i.e., the touch sensing image) that conforms to the specific image format described above. For example, the processor 130 may generate the grayscale image of N-bits according to the transformation frame. Namely, the processor 130 requires to normalize the new cell values in the transformation frame to be between a grayscale interval $0\sim(2^N-1)$. The normalization operation may be used to normalize a value range of the new cell values in the transformation frame. Moreover, in an embodiment, if the subsequent image processing has a special requirement on image size, the processor 130 may also perform zoom processing and/or fill redundant image blocks to make the size of the touch sensing image conform to the requirement of the subsequent image processing.

Then, in a step S204, the processor 130 analyzes the touch sensing image to recognize object information of a touch object. In an embodiment, the processor 130 may input the touch sensing image into a machine learning model to recognize the object information of the touch object through the machine learning model. The object information includes an object type, an object model, positions of components of the touch object or other information, etc. In other words, by letting the touch object to touch the touch object or be close enough to the touch panel, the touch sensing image may be used to recognize the related information of the touch object.

In an embodiment, the machine learning model is a neural network model constructed in advance for machine learning (such as deep learning) based on a training image set, which may be stored in the storage device 120. In other words, model parameters (for example, the number of neural network layers and a weight of each neural network layer, etc.) of the machine learning model have been determined by prior training and stored in the storage device 120. When the touch sensing image is input to the machine learning model, the machine learning model first performs feature extraction to generate feature vectors. Thereafter, the feature vectors are input to a classifier in the machine learning model, and the classifier classifies the feature vectors to recognize the object information of the touch object in the touch sensing image. The machine learning model may be R-CNN, Fast R-CNN, Faster R-CNN, Yolo or SSD, etc., in a Convolution Neural Network (CNN) model used for object detection, which is not limited by the invention. It should be noted that in an embodiment, the training image set used for training the machine learning model may also be generated in a method similar to the steps S201-S203.

Figure 4:
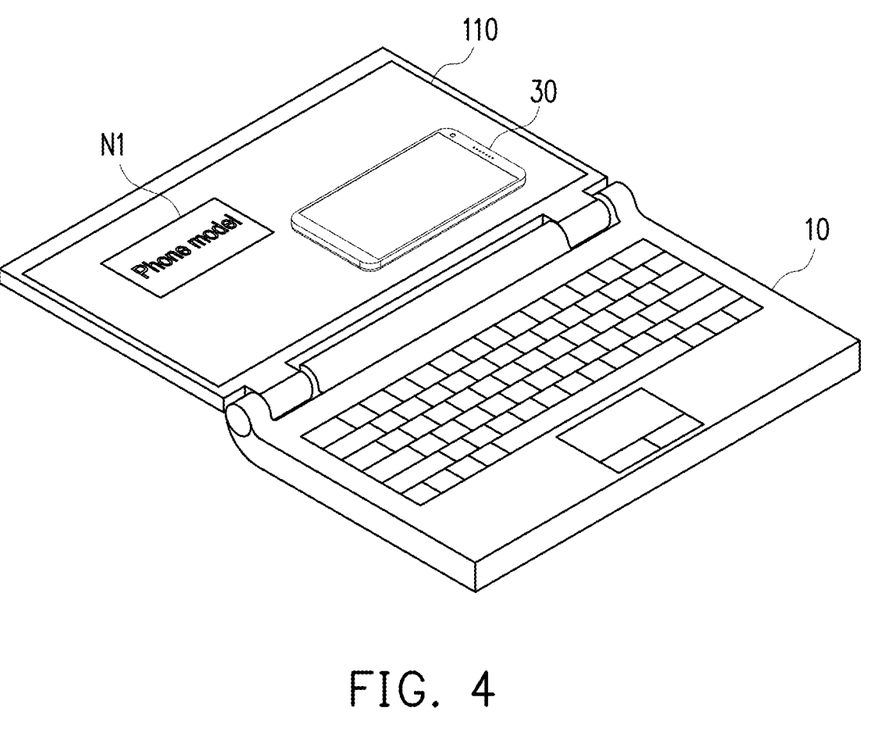
FIG. 4 is a schematic diagram of a situation of an object information recognition method by using touch data according to an embodiment of the invention.

FIG. 4 is a schematic diagram of a situation of an object information recognition method by using touch data according to an embodiment of the invention. Referring to FIG. 4, the touch panel 110 of the electronic apparatus 10 and a display device are integrated into a touch screen. When the touch object 30 (for example, a mobile phone) is placed on top of the touch screen, the processor 130 may obtain a current touch sensing frame generated by the touch panel 110 in a frame period. Then, the processor 130 may perform denoising processing on the current touch sensing frame to generate a transformation frame, and transform the transformation frame into a touch sensing image. In this way, in the embodiment, the processor 130 may use the machine learning model and the touch sensing image to recognize a phone model of the touch object 30, and displays a notification information N1 including the phone model on the touch screen. In detail, the touch raw data sensed by the touch sensing units reacts with approaching of internal/external components of the touch object 30 to generate corresponding charge changes, so that the touch sensing image carries the feature information of the touch object 30, and the feature information of the touch object 30 may be recognized based on the touch sensing image. For example, a metal component configuration inside a mobile phone 'model A' is not the same as a metal component configuration inside a mobile phone 'model B'. Therefore, the image feature of the touch sensing image generated by placing the mobile phone "model A" on the touch panel 110 is different from the image feature of another touch sensing image generated by placing the mobile phone "model B" on the touch panel 110.

Figure 5:
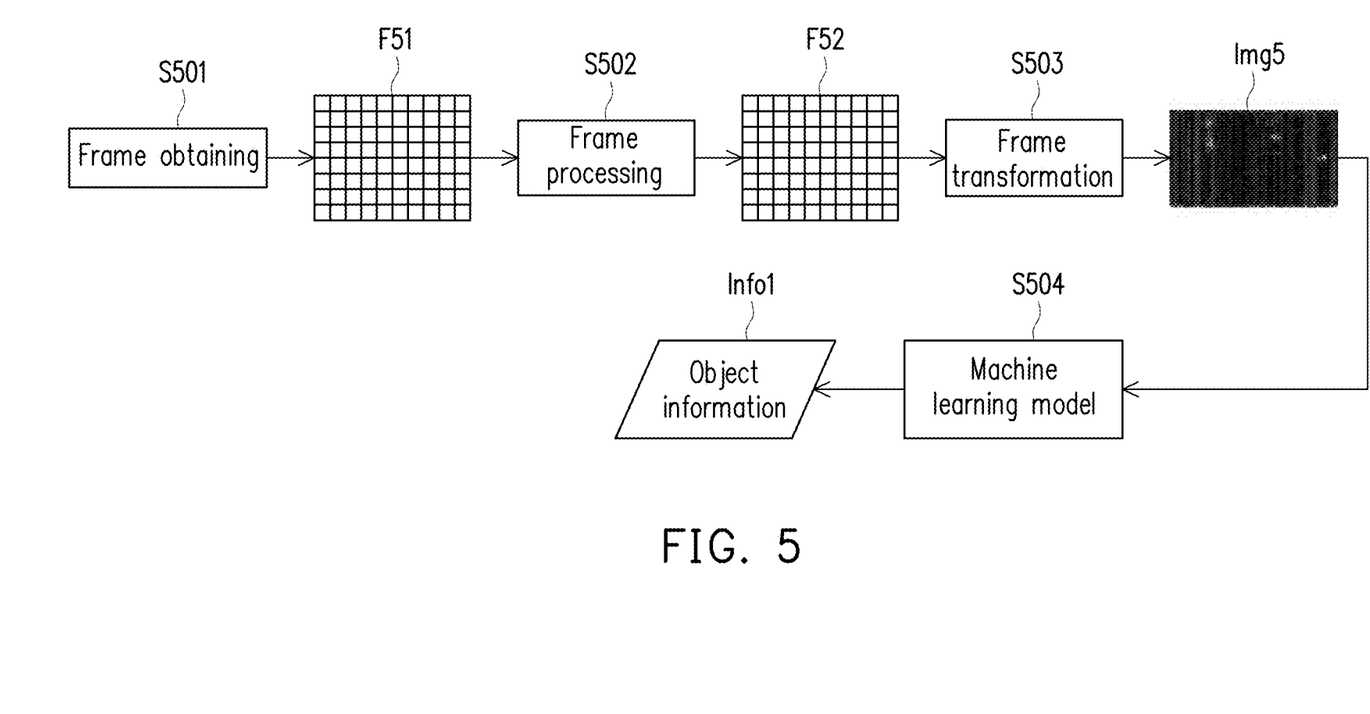
FIG. 5 is a flowchart illustrating an object information recognition method by using touch data according to an embodiment of the invention.

However, the implementation of the invention is not limited to the above description, and the content of the above embodiment may be changed or extended according to an actual requirement. In order to clearly convey the spirit of the invention, an embodiment is further provided below with reference of various components of the electronic apparatus 10 of FIG. 1. FIG. 5 is a flowchart illustrating an object information recognition method by using touch data according to an embodiment of the invention.

Referring to FIG. 1 and FIG. 5, in a step S501, the processor 130 obtains a current touch sensing frame F51 coming from the touch panel 110, and the current touch sensing frame F51 includes touch raw data generated by each touch sensing unit on the touch panel 110.

In a step S502, the processor 130 performs frame processing according to the current touch sensing frame F51 to generate new cell values corresponding to each of the frame cells on the current touch sensing frame F51, so as to generate a transformation frame F52 according to the new cell values. In an embodiment, the processor 130 sequentially takes each of the frame cells on the current touch sensing frame F51 as a target frame cell to calculate the new cell values. The processor 130 generates the new cell value corresponding to the target frame cell according to an absolute difference between the touch raw data of the target frame cell and the touch raw data of the adjacent frame cells and the number of the adjacent frame cells. For example, the processor 130 may generate the new cell value corresponding to the target frame cell according to a following equation (1):

$$\text{new cell value} = \frac{\left|(Num \times RawT) - \left(\sum_{i=1}^{Num} Raw_i\right)\right|}{Num} \quad \text{equation (1)}$$

Where, in the equation (1), Num represents the number of the adjacent frame cells, RawT represents the touch raw data of the target frame cell, and $Raw_i$ represents the touch raw data of the adjacent frame cells.

In an embodiment, the processor 130 may determine the target frame cell and the adjacent frame cells thereof according to a sampling window (a sampling mask). The target frame cell is located at a center of the sampling window, and the adjacent frame cells may be frame cells that are in a vertical adjacent direction, a horizontal adjacent direction, or two diagonal adjacent directions of the target frame cell in the sampling window. A size of the sampling window may be configured to 3*3, 5*5 or other size, which is not limited by the invention.

In an embodiment, the adjacent frame cells may include a plurality of first layer adjacent frame cells located around the target frame cell and located directly adjacent to the target frame cell. In other words, the first layer adjacent frame cells may be eight adjacent frame cells that are located directly adjacent to the target frame cell in the sampling window, and the eight adjacent frame cells are respectively located in the vertical adjacent direction, the horizontal adjacent direction and the two diagonal adjacent directions of the target frame cell.

Figure 6:
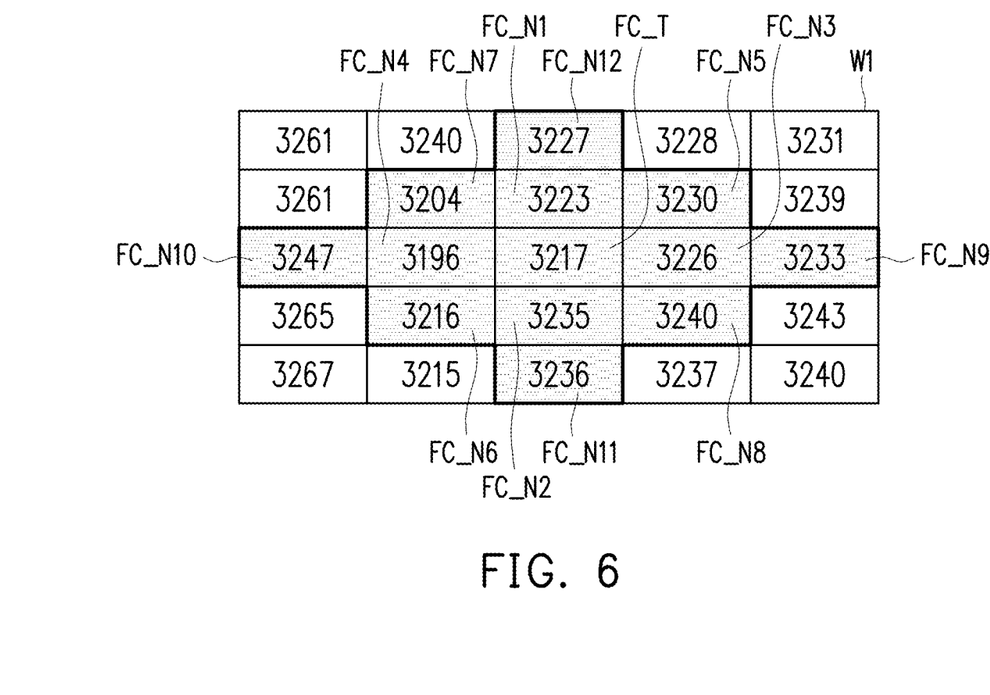
FIG. 6 is a schematic diagram of a target frame cell and adjacent frame cells thereof according to an embodiment of the invention.

In an embodiment, besides the eight adjacent frame cells that are located directly adjacent to the target frame cell, the adjacent frame cells used for calculating the new cell values further include a plurality of second layer adjacent frame cells separated from the target frame cell by the first layer adjacent frame cells in the vertical adjacent direction and the horizontal adjacent direction of the target frame cell. Referring to FIG. 6, FIG. 6 is a schematic diagram of the target frame cell and the adjacent frame cells thereof according to an embodiment of the invention. The target frame cell FC_T is located at a center of a sampling window W1. The adjacent frame cells of the target frame cell FC_T include first layer adjacent frame cells FC_N1, FC_N2 located directly adjacent to the target fame cell FC_T in the vertical adjacent direction. The adjacent frame cells of the target frame cell FC_T include first layer adjacent frame cells FC_N3, FC_N4 located directly adjacent to the target fame cell FC_T in the horizontal adjacent direction. The adjacent frame cells of the target frame cell FC_T include first layer adjacent frame cells FC_N5, FC_N5, FC_N7, FC_N8 located directly adjacent to the target fame cell FC_T in the two diagonal adjacent directions. Moreover, the adjacent frame cells of the target frame cell FC_T further include second layer adjacent frame cells FC_N9, FC_N10, FC_N11, FC_N12 located in the vertical adjacent direction and the horizontal adjacent direction of the target frame cell FC_T. Namely, in the exemplary embodiment of FIG. 6, the number of the adjacent frame cells is 12.

In the exemplary embodiment of FIG. 6, according to the equation (1), the processor 130 takes a calculation result of [|12*3217−38713|]/12 as the new cell value corresponding to the target frame cell FC_T, where 38713 is a sum of the touch raw data of the first layer adjacent frame cells FC_N1-FC_N8 and the second layer adjacent frame cells FC_N9-FC_N12. However, the values shown in FIG. 6 are only an exemplary example, which are not used for limiting the invention. In an embodiment, by taking an average of the absolute differences between the touch raw data of the target frame cell and the touch raw data of the adjacent frame cells as a new cell value of the transformation frame, the touch sensing image generated based on the transformation frame may more accurately describe the object features of the touch object. In this way, recognition accuracy of object information recognition performed according to the touch sensing image may be improved.

Referring back to the flow of FIG. 5, in a step S503, the processor 130 transforms the transformation frame F52 into a touch sensing image Img5. In an embodiment, the processor 130 may perform a numerical normalization operation on the new cell value in the transformation frame F52. The processor 130 may normalize the new cell value in the transformation frame F52 according to the maximum cell value and the minimum cell value in the transformation frame F52, so as to generate a pixel value of the touch sensing image Img5. The touch sensing image Img5 is, for example, a grayscale image of 8-bits.

The numerical normalization operation may be used to normalize a value range of the new cell value in the transformation frame F52. For example, the processor 130 may execute the numerical normalization operation according to a following equation (2):

$$X' = \frac{X - X_{min}}{X_{max} - X_{min}} * 255 \quad \text{equation (2)}$$

In the equation (2), X represents a certain new cell value in the transformation frame F52, $X_{min}$ represents the minimum cell value in the transformation frame F52, $X_{max}$ represents the maximum cell value in the transformation frame F52, and X' represents a pixel value on the touch sensing image Img5. According to the equation (2), each of the new cell values in the transformation frame F52 may be adjusted to a grayscale value between 0 and 255.

Finally, in a step S504, the processor 130 inputs the touch sensing image Img5 to the machine learning model to recognize a position of the touch object relative to the touch panel 110 and the object information Info1 of the touch object. For example, the processor 130 may recognize a device model of the touch object according to the touch sensing image Img5, or recognize a camera lens position of the touch object, etc.

However, in the aforementioned embodiments, the touch sensing images for recognizing the object information are all generated by using one current touch sensing frame, but the invention is not limited thereto. In an embodiment, the processor 130 may generate the touch sensing image for recognizing the object information according to a previous touch sensing frame and at least one current touch sensing frame.

Figure 7:
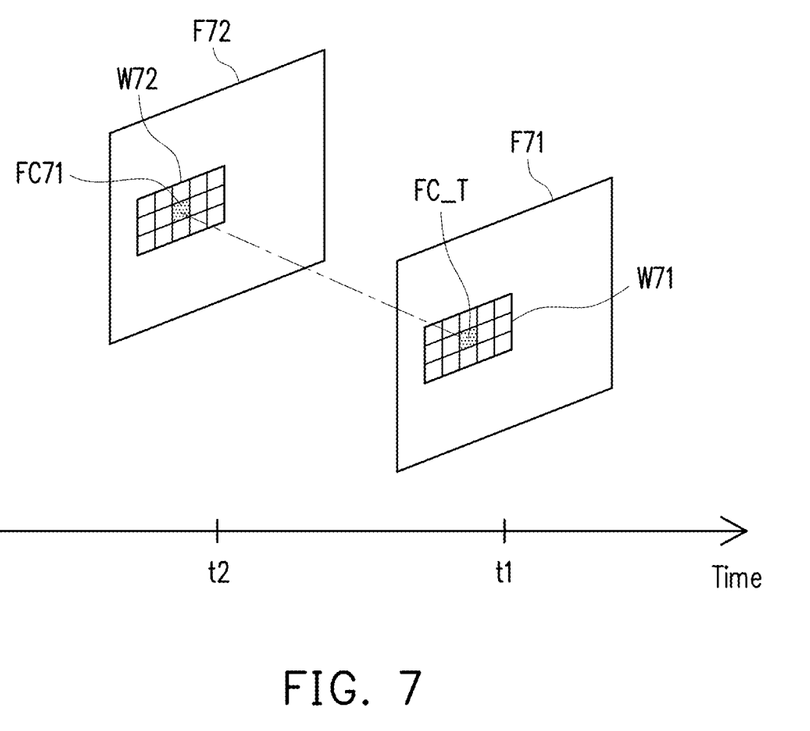
FIG. 7 is a schematic diagram of a previous touch sensing frame and a current touch sensing frame according to an embodiment of the invention.

To be specific, in an embodiment, the processor 130 may generate the new cell value corresponding to the target frame cell according to touch raw data of a previous touch sensing frame and the touch raw data of the current touch sensing frame. FIG. 7 is a schematic diagram of a previous touch sensing frame and a current touch sensing frame according to an embodiment of the invention. Referring to FIG. 7, the processor 130 may obtain a current touch sensing frame corresponding to a current time point t1 and a previous touch sensing frame F72 corresponding to a previous time point t2. When the new cell value corresponding to the target frame cell FC_T is to be calculated, the processor 130 may perform the calculation according to touch sensing data of the adjacent frame cells in a sampling window W71 of the current touch sensing frame F71 and touch sensing data of referential frame cells in a sampling window W72 of the previous touch sensing frame F72. In an embodiment, a cell position of a frame cell FC71 in the sampling window W72 is the same with a cell position of the target frame cell FC_T, and cell positions of the referential frame cells in the sampling window W72 may be the same with cell positions of the adjacent frame cells in the sampling window W71.

In summary, in the embodiments of the invention, the touch raw data in the touch sensing frame may be used to recognize the object information of the touch object, and is not only used for detecting a touch gesture or an input of a stylus. By making the touch object touch or close enough to the touch panel, the electronic apparatus may accurately recognize the related object information of the touch object, so as to use the related object information of the touch object to execute other subsequent applications. In this way, the user may implement other applications of the electronic apparatus through a more intuitive operation method, so as to improve the convenience of operating the electronic apparatus. Moreover, by performing denoising processing on the touch sensing frame, the adverse effects of the touch sensing noise on image recognition may be eliminated, and the recognition accuracy of machine learning may be improved.

It will be apparent to those skilled in the art that various modifications and variations can be made to the disclosed embodiments without departing from the scope or spirit of the invention. In view of the foregoing, it is intended that the invention covers modifications and variations provided they fall within the scope of the following claims and their equivalents.

What is claimed is:

1. An object information recognition method by using touch data, comprising:
obtaining a current touch sensing frame through a touch panel, wherein the current touch sensing frame comprises a plurality of frame cells respectively corresponding to a plurality of touch sensing sensors, each of the frame cells has touch raw data, and the frame cells comprise a target frame cell;
generating a new cell value corresponding to the target frame cell according to touch raw data of a plurality of adjacent frame cells located adjacent to the target frame cell in the current touch sensing frame, so as to generate a transformation frame according to the new cell value;
transforming the transformation frame into a touch sensing image; and
analyzing the touch sensing image to recognize object information of a touch object,
wherein the step of generating the new cell value corresponding to the target frame cell according to the touch raw data of the adjacent frame cells located adjacent to the target frame cell in the current touch sensing frame, so as to generate the transformation frame according to the new cell value comprises:
generating the new cell value corresponding to the target frame cell according to an absolute difference between the touch raw data of the target frame cell and the touch raw data of the adjacent frame cells and the total number of the adjacent frame cells,
wherein the new cell value corresponding to the target frame cell is generated by dividing the absolute difference by the total number of the adjacent frame cells.

2. The object information recognition method by using touch data as claimed in claim 1, wherein the step of transforming the transformation frame into the touch sensing image comprises:
normalizing the new cell value in the transformation frame according to a maximum cell value and a minimum cell value in the transformation frame, so as to generate a pixel value of the touch sensing image.

3. The object information recognition method by using touch data as claimed in claim 1, wherein the adjacent frame cells comprise a plurality of first layer adjacent frame cells located around the target frame cell and located directly adjacent to the target frame cell.

4. The object information recognition method by using touch data as claimed in claim 3, wherein the adjacent frame cells further comprise a plurality of second layer adjacent frame cells separated from the target frame cell by the first layer adjacent frame cells in a vertical adjacent direction and a horizontal adjacent direction of the target frame cell.

5. The object infoiiiiation recognition method by using touch data as claimed in claim 1, wherein the step of generating the new cell value corresponding to the target frame cell according to the touch raw data of the adjacent frame cells located adjacent to the target frame cell in the current touch sensing frame, so as to generate the transformation frame according to the new cell value comprises:
generating the new cell value corresponding to the target frame cell according to touch raw data of a previous touch sensing frame.

6. The object information recognition method by using touch data as claimed in claim 1, wherein the step of analyzing the touch sensing image to recognize the object information of the touch object comprises:
inputting the touch sensing image to a machine learning model, so as to recognize the object information of the touch object through the machine learning model.

7. The object information recognition method by using touch data as claimed in claim 1, wherein the object information comprises an object type, an object model, or positions of components of the touch object.

8. An electronic apparatus, comprising:
a touch panel, comprising a plurality of touch sensing sensors;
a storage device, storing a plurality of instructions; and
a processor, coupled to the touch panel and the storage device, and configured to execute the instructions to:
obtain a current touch sensing frame through the touch panel, wherein the current touch sensing frame comprises a plurality of frame cells respectively corresponding to the touch sensing sensors, each of the frame cells has touch raw data, and the frame cells comprise a target frame cell;
generate a new cell value corresponding to the target frame cell according to touch raw data of a plurality of adjacent frame cells located adjacent to the target frame cell in the current touch sensing frame, so as to generate a transformation frame according to the new cell value;
transform the transformation frame into a touch sensing image; and
analyze the touch sensing image to recognize object information of a touch object,
wherein the processor is further configured to:
generate the new cell value corresponding to the target frame cell according to an absolute difference between the touch raw data of the target frame cell and the touch raw data of the adjacent frame cells and the number of the adjacent frame cells, wherein the new cell value corresponding to the target frame cell is generated by dividing the absolute difference by the total number of the adjacent frame cells.

9. The electronic apparatus as claimed in claim 8, wherein the processor is further configured to:

normalize the new cell value in the transformation frame according to a maximum cell value and a minimum cell value in the transformation frame, so as to generate a pixel value of the touch sensing image.

10. The electronic apparatus as claimed in claim 8, wherein the adjacent frame cells comprise a plurality of first layer adjacent frame cells located around the target frame cell and located directly adjacent to the target frame cell.

11. The electronic apparatus as claimed in claim 8, wherein the adjacent frame cells further comprise a plurality of second layer adjacent frame cells separated from the target frame cell by the first layer adjacent frame cells in a vertical adjacent direction and a horizontal adjacent direction of the target frame cell.

12. The electronic apparatus as claimed in claim 8, wherein the processor is further configured to:

generate the new cell value corresponding to the target frame cell according to touch raw data of a previous touch sensing frame.

13. The electronic apparatus as claimed in claim 8, wherein the processor is further configured to:

input the touch sensing image to a machine learning model, so as to recognize the object information of the touch object through the machine learning model.

14. The electronic apparatus as claimed in claim 8, wherein the object information comprises an object type, an object model, or positions of components of the touch object.

\* \* \* \* \*